June 29, 1965  R. S. JONES ETAL  3,191,705
VEHICLES FOR TRAVELLING OVER WATER
Filed Sept. 13, 1960  7 Sheets-Sheet 1

Inventors
RICHARD S. JONES
DEREK J. HARDY
By Cameron, Kerkam & Sutton
Attorneys

June 29, 1965 R. S. JONES ETAL 3,191,705
VEHICLES FOR TRAVELLING OVER WATER
Filed Sept. 13, 1960 7 Sheets-Sheet 2

INVENTOR
RICHARD S. JONES
DEREK J. HARDY
BY Cameron, Kerkam & Sutton
ATTORNEYS

Inventors
RICHARD S. JONES
DEREK J. HARDY
By Cameron, Kerkam & Sutton
Attorneys

June 29, 1965  R. S. JONES ETAL  3,191,705
VEHICLES FOR TRAVELLING OVER WATER
Filed Sept. 13, 1960  7 Sheets-Sheet 7

Inventors
RICHARD S. JONES
DEREK J. HARDY
By Cameron, Kerkam & Sutton
Attorneys

United States Patent Office 3,191,705
Patented June 29, 1965

3,191,705
VEHICLES FOR TRAVELLING OVER WATER
Richard Stanton Jones and Derek James Hardy, Isle of Wight, England, assignors to Hovercraft Development Limited, London, England, a British company
Filed Sept. 13, 1960, Ser. No. 55,675
Claims priority, application Great Britain, Sept. 25, 1959, 32,698/59
8 Claims. (Cl. 180—7)

This invention relates to vehicles for travelling over water of the kind described in the co-pending patent application of Christopher Sidney Cockerell, Serial No. 819,968, filed July 12, 1959. Such a vehicle is in operation supported on a pressurised cushion contained by a curtain formed by a jet of fluid issuing from the bottom of the vehicle, after the manner described in patent application Serial No. 627,025, also filed by Christopher Sidney Cockerell on December 12, 1956, with the further feature that side members or walls depend from the bottom of the main structure of the vehicle and assist in containing the said cushion. The two above-mentioned applications and the present application are assigned to the same assignee. In this vehicle, although the curtains at the front and back of the vehicle have to be of sufficient height to extend from the bottom of the vehicle proper to the surface of the water over which it is operating, at the sides of the vehicle curtains could be dispensed with altogether leaving the side walls to float in the water, or the side walls could be provided with curtains less in height than those at the front and back by approximately the height of the side walls, thus bringing about in either case a considerable economy in the power required to lift the vehicle, such economy, however, being at the expense of the additional drag due to any parts of the side walls which are immersed in the water.

Nevertheless, in order to sustain the additional height of the front and back curtains it was necessary to give these curtains a correspondingly high thrust or to provide certain structural devices described in the aforesaid patent application Serial No. 819,968. An object of the present invention is to save power and/or obviate the need for the said structural devices. According to the invention there is provided a vehicle for travelling over water which is supported above the surface of the water by at least one cushion of pressurised fluid contained beneath the vehicle in which at least one side wall or member depends from the bottom of the vehicle on each side thereof and in which at least one obturating member is provided at the front and/or rear of the vehicle, each such obturating member extending between the side walls and being flexible and/or flexibly attached to the vehicle, means being provided in the bottoms of the side walls and/or the obturating members for the formation of at least one fluid curtain, the obturating member or members together with the side walls, the fluid curtain and the structure of the vehicle forming at least part of the cushion containing means.

According to a further feature of the invention the side walls or members are also flexible or are flexibly attached to the vehicle.

According to another feature of the invention means are provided in the bottoms of the side walls and the obturating members for the formation of a curtain or curtains of fluid beneath the side walls and obturating members and with the side walls and the obturating members and the structure of the vehicle forming the cushion containing means.

If the said obturating member is a flap or door, means are provided for preventing movement of the door in a forward direction beyond the normal position and the door is pivoted about a substantially horizontal axis perpendicular to the side walls or is otherwise capable of moving aft when struck by a wave crest and, in the case of a door at the rear of the vehicle, restoring means are provided to maintain the door in the said normal position against the pressure of the cushion. It will be understood that in the case of the forward door, no restoring means are necessary as the door is held in its normal position by the cushion pressure. It will further be understood that the terms "forward" and "front" on the one hand and "back" and "aft" on the other have reference to the intended direction of motion of the vehicle.

Where curtains of fluid are formed beneath the side walls and/or the obturating members, these may, and generally will, act to form and maintain the pressurised cushion or cushions. Alternatively or in addition, means for forcing fluid directly into the space or spaces occupied by the cushion or cushions, may be provided. Where the cushion is formed and maintained by curtains of fluid these may issue from both the side walls and the obturating members, or from the side walls only or the obturating members only. The choice from these alternatives is in the main a compromise between the power it is desired to expend on lift and propulsion respectively.

The side members may be at least partly immersed at all times or are only partly immersed for part of the time, for example, when waves are encountered. Since, however, the obturating members are capable of rising or moving aft, they do not in fact remain in their normal positions when a wave is encountered, but are impelled aft or upwards by the wave sufficiently far to clear it. Hence they do not seriously increase the drag on the vehicle nor do they have to withstand excessive impacts. On the other hand, they form a substantial part of the boundary enclosing the cushion without consuming any power.

The invention is applicable to platforms such as, for example, a platform for a radar installation at sea, and the term "vehicle" as used herein is to be understood as including, where the context permits, a platform.

The invention will be readily understood by the following description of various embodiments in conjunction with the accompanying drawings in which:

FIGURES 5 to 9 are similar cross sections to that of FIGURE 4, illustrating various other forms of obturating members while

FIGURES 10 to 13 are further cross sectional views, similar to those of FIGURES 5 to 9, illustrating still further forms of obturating members, only one member being shown in each case, while

The vehicle shown in FIGS. 1, 2, 2A and 3 is generally rectangular in plan view and is provided with a main body 1 from which depend rigid hollow side walls 2, and is of the type which operates normally completely clear of the surface, fluid curtains being formed beneath the side walls as, for example, in the manner disclosed in the aforesaid patent application Serial No. 819,968. Air under pressure is supplied by fans 3 to the space in each side wall which acts as a main duct for supplying the curtain-forming air. A rigid door 4 having as low an inertia as possible is pivoted or hinged to the bottom of the vehicle near the forward end and a similar door 5 is hinged at the rear end of the vehicle. The width of each door is such that it fits as closely as possible between the side walls consistent with free movement on its hinge.

Figure 3:
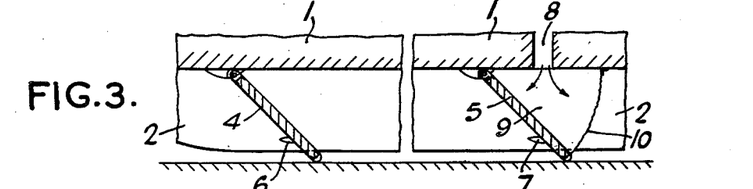
FIGURE 3 is a cross sectional view parallel to the longitudinal axis of the vehicle, to an enlarged scale, of the front and rear obturating members shown in FIGURES 1 and 2.

The vehicle is shown in its operative condition in which it is raised from the surface by a cushion of pressurised air enclosed between the side walls 2, air curtains C formed by jets of air issuing from ports 21 (see FIG. 2A) running the length of each side wall, and the front and rear doors 4 and 5. In this form of the invention the front and rear doors are not provided with curtain-forming jets but in their normal positions as shown in the drawings their lower edges are in contact with the surface when the vehicle is hovering. The pressurised cushion, assisted by gravity, normally holds the forward door 4 against a stop member 6. On the other hand the cushion pressure exerts a force on the rear door 5 which tends to open it, this force being much greater than the weight of the door. In order to hold the rear door against its stop 7, therefore, a part of the air from the fans 3 is conducted by way of an opening 8 in the bottom of the vehicle to a space 9 behind the door which is enclosed by a flexible air-tight diaphragm 10 which may, for example, be made of a rubberised fabric. It will be seen that presure in the space 9 is approximately the same as the stagnation pressure of the curtain-forming jets which is greater than the cushion pressure, so that the door 5 is normally held against the stop 7.

When the vehicle encounters a wave, the doors 4 and 5 are easily raised by the impact of the water to a height at which they clear the wave, little air being lost from the cushion in the process.

In case the force exerted on the forward door by the cushion is so great as to inhibit the upward movement of the door on encountering a wave, a tension spring or hydraulic device may be provided which partially counteracts the action of the cushion pressure.

Figure 4:
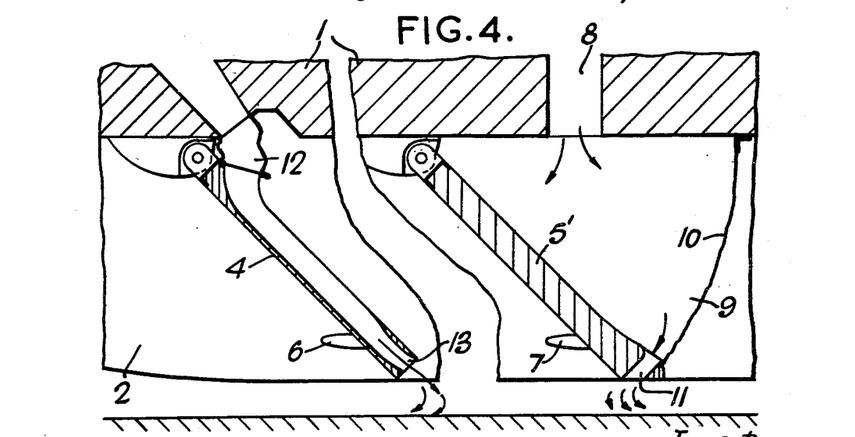
FIGURE 4 is a cross section, similar to that of FIGURE 3, to a larger scale, of an alternative form of front and rear obturating members.

The arrangement of FIG. 4 is similar to that of FIG. 3, except that provision is made for the formation of curtains at the bottom edge of each door. The forward door 4' is hollow and is provided at its lower edge with a supply port 13 extending along its width, the hollow space in the door being connected by way of a flexible tube 12 at each end with the ducts in the side walls 2. In the case of the rear door 5', the supply port for the curtain-forming air is formed by a slot 11 extending along the lower edge of the door, through which air from the space 9 issues. It will be seen that with this arrangement the jet from the supply port 11 as well as that from the supply port 13 issues in a downward and inward direction, which is the most efficient for curtain formation. It will also be seen that both doors are of such a length that they do not protrude below the side walls, the seal for the cushion being completed by the curtains from the bottoms of the doors.

Figure 5:
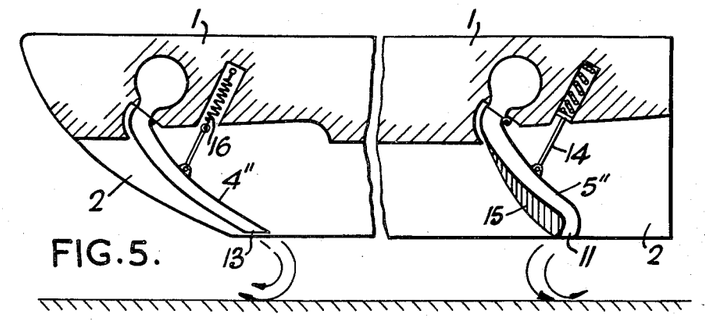

FIG. 5 is similar to FIG. 4 except that the pressure chamber 9 formed by the diaphragm 10 is replaced by a compression spring 14 and the two doors 4" and 5" are given a curved shape so that they maintain substantially the same angle of attack with respect to the water as the doors are raised. Since the pressurised space 9 is not provided, the rear door 5" must be hollow to provide a duct for feeding the supply port 11. This duct curves inwards at the lower end and fairing 15 is provided to give the door the correct shape. FIG. 5 also shows a tension spring 16 for the front door 4" which enables the stop 6 to be dispensed with. Similarly, the stop 7 can also be dispensed with as shown by correct adjustment of the strength of spring 14.

Figure 6:
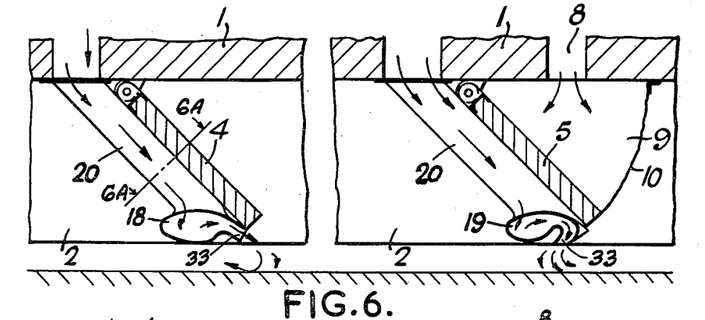
Figure 6A:
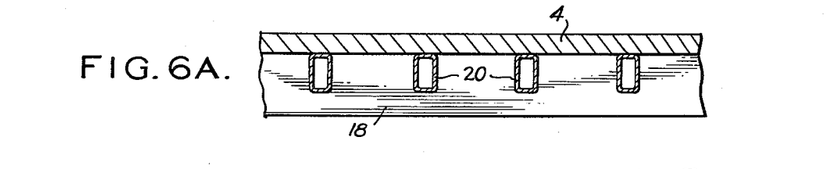
FIGURES 6A, 7A and 9A are fragmentary transverse sections on the lines 6A—6A, 7A—7A and 9A—9A in FIGURES 6, 7, and 9, respectively.

In FIG. 6 fixed ducts 18 and 19 are mounted between the side walls at the front and back of the vehicle. The ducts are supplied with air from the side wall ducts by way of hollow struts 20. Each duct is provided with a supply port 33 extending along its length, the orientation of the duct immediately upstream of the port being such as, in each case, to direct air from the port in a downward and inward direction. The tubular member constituting each of the ducts serves as a stop member in place of the stops 6 and 7 of FIGS. 3 and 4. If a number of struts 20 are provided across the front and rear of the vehicle, as illustrated in FIG. 6A, the doors 4 and 5 can be made of flexible material as described below with reference to FIG. 7.

Figure 7:
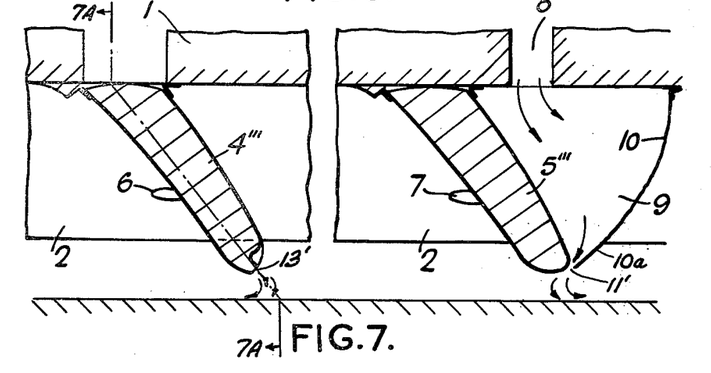
Figure 7A:
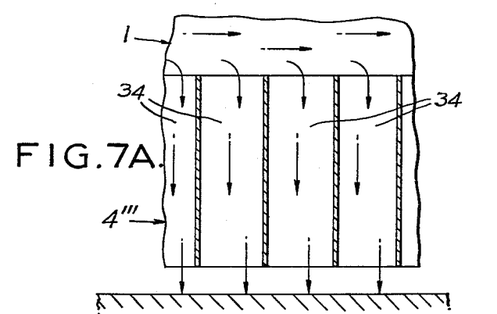

The construction of FIG. 7 is the same as that of FIG. 4 except that the rigid hinged doors are replaced by flexible doors 4''' and 5''' which are fixed to the bottom of the vehicle but are sufficiently flexible to be readily deflected by waves while being nevertheless rigid enough to remain substantially undeformed by the cushion pressure or the pressure in space 9 as the case may be. The doors may, for example, be made of inflated rubberised fabric subdivided into cells 34 as shown in FIG. 7A, in which case air for forming the curtain issuing from the supply port 13' of forward door 4''' is the same as the air which inflates the fabric. The construction of FIG. 7 also differs from that shown in FIG. 4 in that the supply port 11' of rear door 5''' is formed by the bottom of the door and a co-operating member 10a which extends transversely between the side walls 2 and forms a continuation of diaphragm 10.

Figure 8:
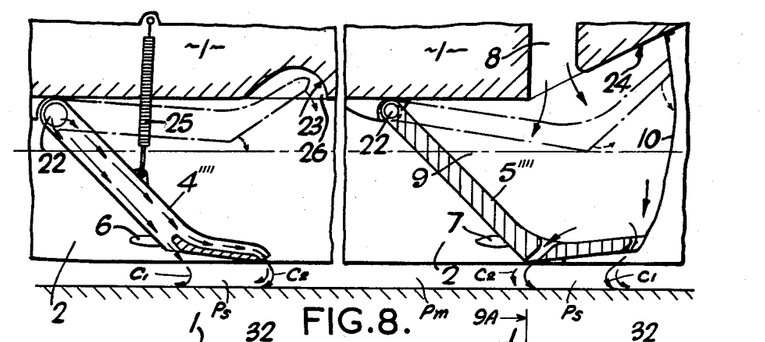

FIG. 8 shows an arrangement in which two curtains $C_1$ and $C_2$ issue from the lower edge of each of the doors 4'''' and 5''''. Air is fed to the forward door through hollow hinges 22. In order to accommodate the projecting parts forming the lower edges of the doors when the surface of the water has risen relative to the vehicle body to the position indicated by the broken horizontal line in FIG. 8, at which time the doors are in their uppermost positions, also shown in broken lines in the figure, a recess 23 is provided in the bottom of the vehicle to receive the end of the door 4'''', while the rear of the vehicle is inclined as shown at 24 to accommodate the door 5''''. The provision of two curtains ensures that there is a subsidiary pressurised cushion $P_s$ under the lower edge of each door. This will tend to cause the lower edge to follow the contour of the waves, thus reducing or eliminating the impact of the waves on the door. In the case of the forward door, however, the pressure of the said cushion $P_s$ is only about half the pressure of the main cushion $P_m$, and it acts over a smaller area. It is therefore necessary to provide means such as a tension spring 25 to assist the upward movement of the door. A clearance 26 allows the main cushion pressure to act on the top or inner surface of the door in its uppermost position, so that the balance of forces remains correct in this position. If the pressure of the subsidiary cushions under the doors, assisted in the case of the forward door by the spring 25, is sufficiently high they will serve to keep the doors in their normal positions (that is their correct positions over a smooth surface), and the stops 6 and 7 may then be dispensed with. The size of the space 9 may be adjusted to provide any required amount of counterbalance for the rear door.

Figure 9:
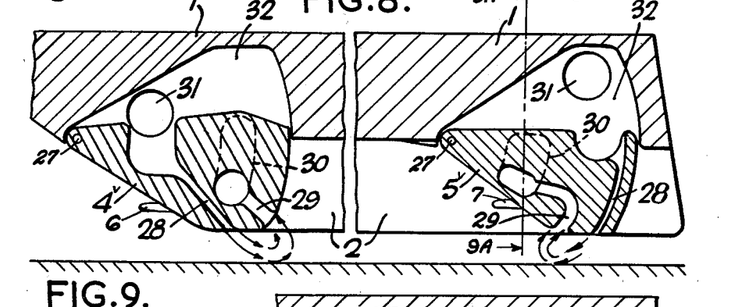
Figure 9A:
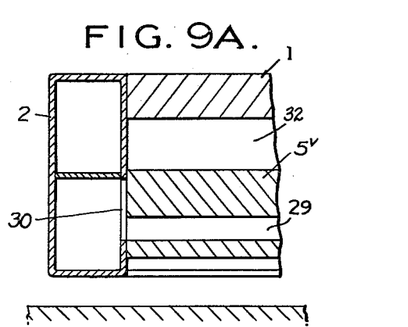

FIGS. 9 and 9A show an arrangement in which each door 4$^v$ and 5$^v$ is provided not only with a duct 28 for supplying air to the curtains, but also with a recovery duct 29 for recovering air spent from the curtain jet to be used again for recirculation in the same or a further curtain or for propulsion. In the case shown, the recovered air issues from rearwards directed outlets 30 in each side wall for the purpose of propelling the vehicle. It will be noted that the cross-sectional shape of each door is approximately the sector of a circle whose centre is at the hinge 27 of the door, and the air is supplied from ducts 31 by way of chambers 32 whose lower boundaries are formed by the doors. The inner ends of outlets 30 in each side wall are also of arcuate shape centered at the hinges 27 so that, as the doors move about their hinges, the outer ends of the upper transversely extending portions of recovery ducts 29 are continuously in communication with the inner ends of outlets 30. By this means the loading of the doors by the cushion pressure is substantially eliminated. This expedient can be used whether or not recovery ducts are provided.

Figures 10, 11:
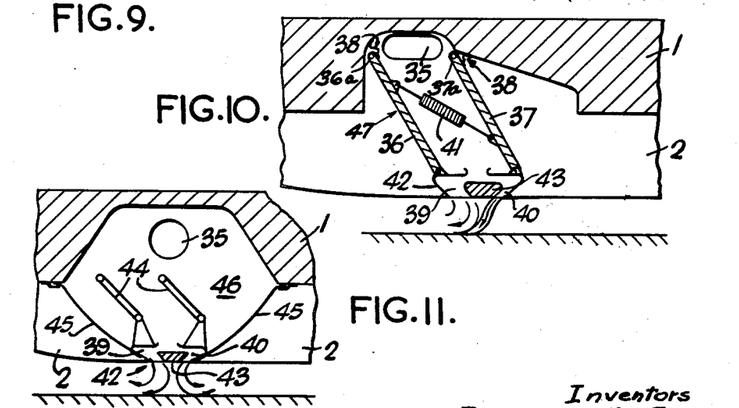

FIG. 10 shows a vehicle in which parallel motion doors 47 are provided. The doors may be identical forward and aft and only one of them is shown in FIG. 10. Each door 47 comprises a pair of members 36 and 37 which are pivoted at their upper ends 36a and 37a to the side walls 2 so as to swing in parallelism. Air for the curtains is supplied through duct 35 into the space between the members 36 and 37 of the doors. Seals 38 are provided to seal this space. The curtain jets issue through supply ports 39 and 40 which are formed in a device 42 which is pivoted to and swings with the lower ends of door members 36, 37 and is provided with a central bar 43. It will be noted that the inner port 40 is directed in an outward direction. This enables a pressure as high as or higher than the main cushion pressure to be sustained in the auxiliary cushions under the doors. Spent air from jet 40 enters the main cushion space and any surplus escapes under the side walls. A spring 41, tension in the case of the forward door and compression in the case of the rear door, provides any necessary compensation for the loading of the doors by the main cushion pressure.

Figure 11A:
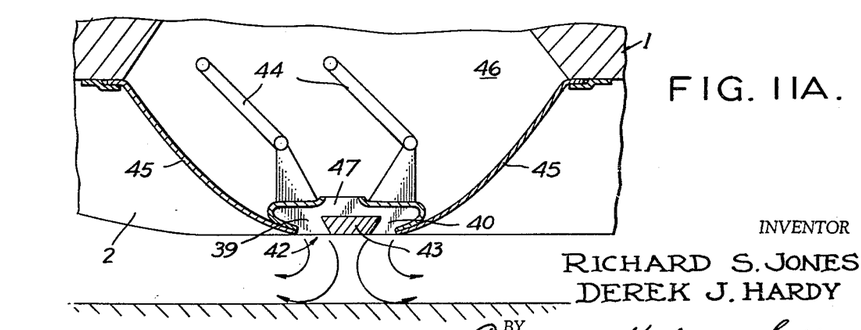
FIGURE 11A is an enlarged showing of a portion of the obturating member of FIGURE 11.

FIGS. 11 and 11A show a somewhat similar arrangement but with the door members 36, 37 replaced by links 44 the upper ends of which are pivoted to the side walls 2 while the lower ends thereof pivotally support the supply port forming device 42, including its central bar 43 and transverse tie members or webs 47. Diaphragms 45 are fixed at their upper and lower edges to the bottom surface of main body 1 and the sides of device 42, respectively, and form a chamber 46 performing the same function as the space between members 36, 37 in FIG. 10.

Figure 12:
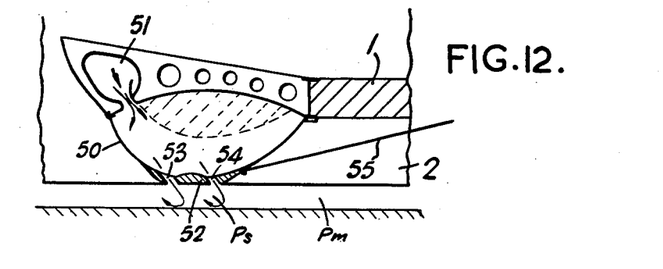

In FIG. 12 the obturating member is constituted by a bag 50 which is fed with pressurised air from a duct 51. Similar members are used at the forward and rear ends of the vehicle, only one being shown in FIG. 12. The bottom of the bag is provided with a stiff member 52 in which are formed supply ports 53, 54, for the curtain forming air. If necessary a restraining strap 55 may be provided between the member 52 and the under-side of the vehicle. The curtains of air issuing from the supply ports 53 and 54 form a subsidiary cushion $P_s$ of pressurised air beneath the stiff member 52, which cushion acts to maintain the stiff member 52, and thus the bottom of the obturating member 50, at a substantially constant distance from the subjacent surface of the water over which the vehicle is travelling. When this surface rises relative to the main body of the vehicle, the stiff member 52 will be deflected upwards and outwards.

Figure 14:
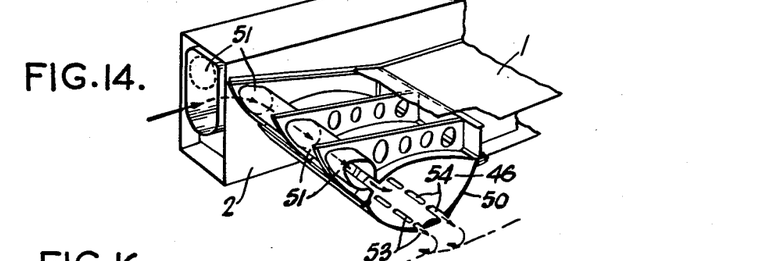
FIGURE 14 is a sectioned perspective view to an enlarged scale of the supply ports of the embodiment illustrated in FIGURE 12 showing more clearly the separate supply ducts for each supply port.

FIG. 14 is an isometric view of the inside of the door shown in FIG. 12 together with part of the cooperating side wall. It will be seen that the supply ports 53 and 54 are not continuous as it is necessary to provide some means for connecting the walls of the bag together.

Figure 13:
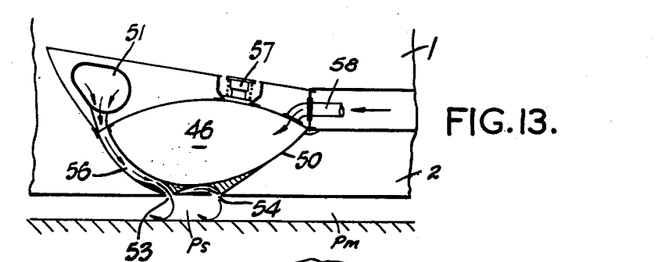

FIG. 13 shows an arrangement which is similar to that of FIG. 12, but in which the supply ports 53 and 54 are fed by alternate tubes 56, and the space 46 within the bag 50 is fed through a tube 58 with air from a separate source, for example, the engine supply reservoir of the vehicle. This enables a pressure relief valve 57 to be provided which will relieve the pressure in the bag when the latter is compressed by a wave.

Figure 15A:
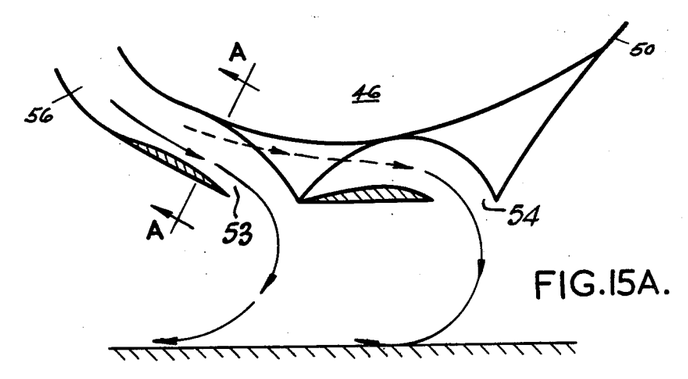
FIGURE 15A is an isometric view of a part of the obturating member illustrated in FIGURE 13 together with a part of one of the co-operating side walls.
Figure 15B:
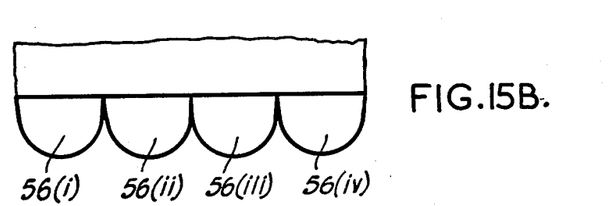
FIGURE 15B is a cross sectional view taken on the line A—A of FIGURE 15A.

FIGS. 15A and 15B illustrate to an enlarged scale the supply ports 53 and 54 and tubes 56 of FIG. 13. FIG. 15A is in the same plane as the aforementioned FIG. 13 and FIG. 15B is a cross section on the line A—A of FIG. 15A. As described above the supply ports 53 and 54 are fed by alternate tubes 56 respectively, that is, in FIG. 15B for example, tubes 56(i) and 56(iii) feed supply port 53 whilst tubes 56(ii) and 56(iv) feed supply port 54.

Figure 16:
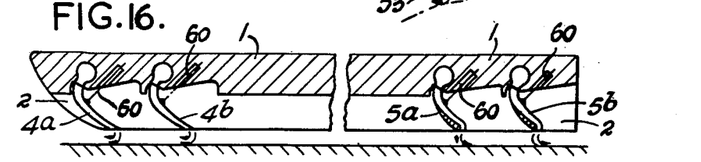
FIGURE 16 is a cross sectional view, similar to that shown in FIGURE 3, illustrating a vehicle which has two obturating members at each end.

FIG. 16 shows diagrammatically a vehicle in which two forward doors 4a and 4b, and two rear doors 5a and 5b are provided, similar to those shown in FIG. 5. Means such as the hydraulic cylinder and piston shown diagrammatically at 60 are provided to enable either door of each pair to be held in a retracted position against the bottom of the vehicle in order to adjust the position of the centre of pressure of the cushion and hence the trim of the vehicle.

Figure 17:
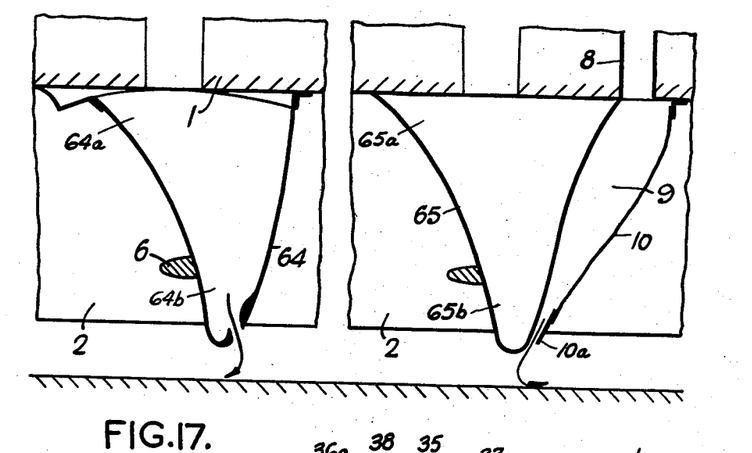
FIGURE 17 is a modification of the embodiment shown in FIGURE 7.

FIG. 17 of the accompanying drawings shows a stiffer form of the doors shown in FIG. 7. The doors 64 and 65 are much thicker at their upper ends 64a and 65a, adjacent to the bottom of the vehicle 1, than at their lower ends 64b and 65b. In other particulars the construction is as described above with reference to FIG. 7. This stiffer form of construction is required, for example, when the vehicle is a comparatively high speed one.

Figure 18A:
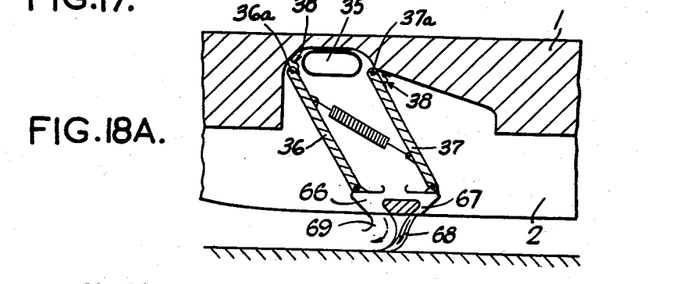
FIGURES 18A and 18B illustrate a modified form of the supply ports shown in FIGURES 10 and 11.
Figure 18B:
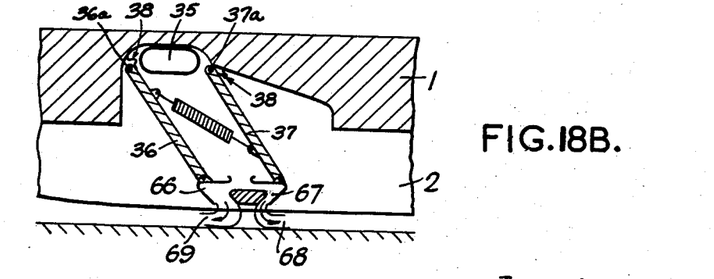

FIGS. 18A and 18B illustrate a modified supply port arrangement applicable to the examples illustrated in FIGS. 10 and 11, the modification being shown as made to FIG. 10. The supply ports 66 and 67 are of different widths, the front port 66 being wider than the rear port 67, for the front door. For the rear door the relationship between the widths of the ports is opposite to that of the front door, i.e., in the rear door the rear port is wider than the front port. The strength of the inner curtain 68 is thus less than the outer curtain 69 and at the normal operating height a curtain formation somewhat as shown in FIG. 18A occurs. When, for any reason, the bottom of the door approaches more nearly to the surface the curtain formation alters until the formation shown in FIG. 18B occurs. This creates an increased pressure in the cushion contained between the two curtains, assisting in lifting the door.

Figure 19:
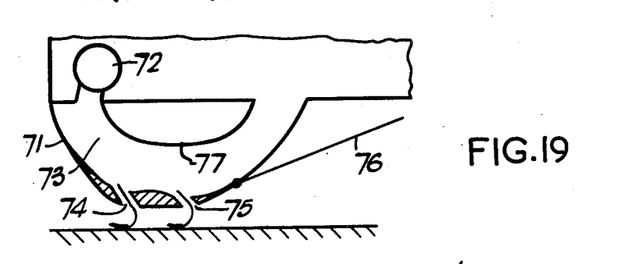
FIGURE 19 illustrates a modified form of the embodiment illustrated in FIGURE 12 particularly suitable for use as a flexible side wall.

As stated above, the side walls may also be flexible or flexibly attached, and FIG. 19 of the accompanying drawings illustrates a modification of the embodiment shown in FIG. 12 particularly suitable for a side wall. The use of curtain pressure fluid for inflating the bag 71 provides a reasonably stiff side wall, which is desirable. Air from a duct 72 is fed into the space 73 within the bag 71, and issues through supply ports 74 and 75 to form curtains. A tie 76 may be provided as before. To enable the vehicle to land on a hard surface when the supply of curtain air is stopped, with the consequent deflating of the bag 71, a further inflated bag 77 may be provided. This bag 77 is permanently inflated either by being completely sealed or by being fed from, for example, a small auxiliary compressor. The provision of the internal bag 77 prevents damage to the ports 74 and 75, when the vehicle lands.

Figure 1:
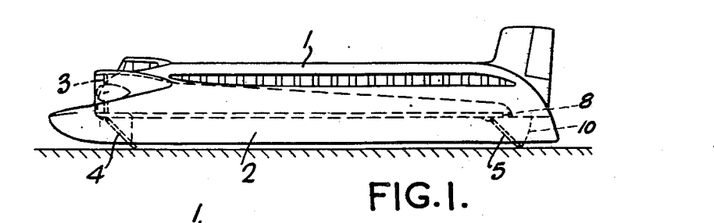
FIGURE 1 is a side view of a vehicle according to the invention.
Figure 2:
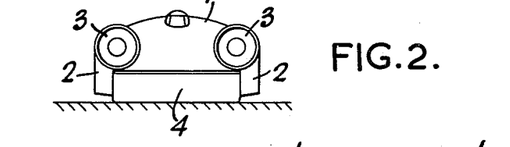
FIGURE 2 is a front view of the vehicle illustrated in FIGURE 1.
Figure 2A:
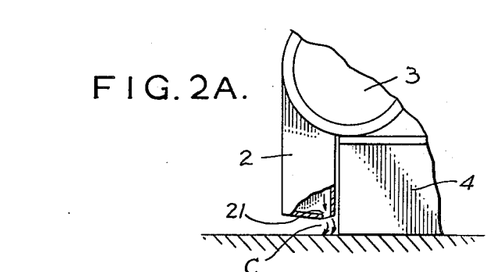
FIGURE 2A is a fragmentary front view of one side of the vehicle illustrated in FIGURE 2, to an enlarged scale, partially broken away to show the port in the bottom of the side wall through which the air curtain issues.
Figure 20:
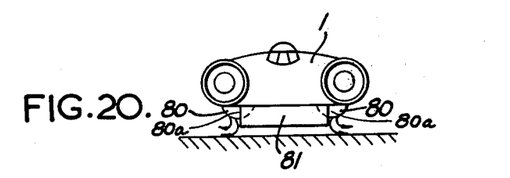
FIGURE 20 is a cross section view normal to the longitudinal axis of the vehicle illustrating an embodiment of the invention in which the side walls are of the form illustrated in FIGURE 19.

A typical front view of a vehicle, similar to FIG. 2 but showing the provision of side walls of the type illustrated in FIG. 19 is shown in FIG. 20 of the accompanying drawings. In the vehicle of FIG. 20, the doors 81 may be of any of the forms shown in the drawings and described above. However, in order to provide a satisfactory seal between the doors and the side walls 80 when the latter are of the type illustrated in FIG. 19, it is necessary for the front and rear ends of the side walls to be modified in cross section. Accordingly, although the side walls have a cross section as shown in FIG. 19 for the major portions of their lengths, at each end where they co-operate with the doors 81 the side walls have vertical inner faces 80a, as shown in FIG. 20. The doors 81 can then deflect up and down with their side edges always in contact with the side walls 80.

Many of the other door constructions illustrated in the drawings may also be used for flexible side walls.

We claim:

1. A vehicle for travelling over water of the kind which is at least partly supported above the surface of the water by a cushion of pressurised fluid contained beneath the body of the vehicle, comprising at least one side wall member depending from the body of the vehicle on each side of the fore and aft axis thereof, at least one obturating member attached to the vehicle body at at least one of the front and rear ends thereof, each such obturating member extending between the side wall members and being so constructed and arranged as to be capable of flexing movement relative to the vehicle body, and means forming at least one curtain of fluid issuing from the bottom portion of at least one of the obturating members, the obturating and side wall members co-operating with the fluid curtain and the body of the vehicle to contain the vehicle supporting cushion of pressurised fluid.

2. A vehicle as claimed in claim 1 in which each obturating member is of flexible construction and is inflatable.

3. A vehicle as claimed in claim 2 in which each obturating member is inflatable by the curtain forming fluid.

4. A vehicle for travelling over water of the kind which is at least partly supported above the surface of the water by a cushion of pressurised fluid contained beneath the vehicle, comprising at least one side wall member depending from the bottom of the vehicle on each side thereof, an obturating member attached to the vehicle at each of the front and rear ends thereof, each such obturating member extending between the side wall members and being so constructed and arranged as to be capable of flexing movement relative to the vehicle, means for forming a curtain of fluid issuing from the bottom portion of at least one of the obturating members, said curtain cooperating with the obturating and side wall members and the structure of the vehicle to contain the vehicle supporting cushion of pressurised fluid, and means for forming a second curtain of fluid issuing from the bottom portion of said one obturating member and positioned outwardly of and spaced from said first curtain, the space between said curtains forming a second cushion of pressurised fluid beneath the bottom of said obturating member which tends to maintain the bottom surface of said obturating member at a predetermined distance above the surface of the water.

5. A vehicle for travelling over water of the kind which is at least partly supported above the surface of the water by a cushion of pressurised fluid contained beneath the body of the vehicle, comprising at least one side wall member depending from the body of the vehicle on each side of the fore and aft axis thereof, at least one obturating member attached to the vehicle body at each of the front and rear ends thereof, each such obturating member extending between the side wall members and being so constructed and arranged as to be capable of flexing movement relative to the vehicle body, and means for forming at least one curtain of fluid issuing from the bottom portion of each of said obturating members, the obturating and side wall members co-operating with the fluid curtains and the body of the vehicle to contain the vehicle supporting cushion of pressurized fluid.

6. A vehicle as claimed in claim 5 in which the means for forming the fluid curtain issuing from at least one of said obturating members comprises at least one supply port in the bottom of said obturating member.

7. A vehicle as claimed in claim 5 in which the means for forming the fluid curtain issuing from at least one of said obturating members comprises a supply port formed by the bottom of said obturating member and the bottom of a diaphragm which is attached to the bottom of the vehicle body and co-operates with said obturating member to form a space through which the curtain forming fluid is supplied.

8. A vehicle for travelling over water of the kind which is at least partly supported above the surface of the water by a cushion of pressurised fluid contained beneath the body of the vehicle, comprising at least one side wall member depending from the body of the vehicle on each side of the fore and aft axis thereof, at least one obturating member attached to the vehicle body at at least one of the front and rear ends thereof, each such obturating member extending between the side wall members, means for flexibly attaching each said obturating member to the vehicle body, and means forming at least one curtain of fluid issuing from the bottom portion of at least one of the obturating members, the obturating and side wall members co-operating with the fluid curtain and the body of the vehicle to contain the vehicle supporting cushion of pressurised fluid.

References Cited by the Examiner

UNITED STATES PATENTS

| | | |
|---|---|---|
| 1,819,216 | 8/31 | Warner. |
| 2,322,790 | 6/43 | Cristadoro. |
| 2,444,318 | 6/48 | Warner. |
| 2,969,032 | 1/61 | Pinnes _______________ 180—7 X |

A. HARRY LEVY, *Primary Examiner.*

PHILIP ARNOLD, *Examiner.*